Patented Oct. 16, 1934

1,977,252

UNITED STATES PATENT OFFICE 1,977,252

VAT DYESTUFF PASTE

Otto Stallmann, South Milwaukee, Wis., assignor to E. I. du Pont de Nemours & Company, Wilmington, Del., a corporation of Delaware No Drawing. Application May 12, 1933, Serial No. 670,747

16 Claims. (Cl. 8—6)

This invention relates to vat dyestuff pastes. It is an object of this invention to provide an improved vat dyestuff paste which is particularly adapted for incorporation into printing pastes, and which when so used is characterized by great tinctorial strength and produces brilliant prints upon fabric. Other and further important objects of this invention will appear as the description proceeds.

In copending application of Ivan Gubelmann, Ser. No. 556,937, it has been disclosed that when water-soluble reaction products of dichlorhydrin and ammonia are incorporated into vat dyestuffs, they have a remarkable and beneficial effect upon their adaptability for use in printing pastes. In general, said resultant printing pastes acquire increased tinctorial strength and produce more brilliant prints as compared to the said dyestuffs when used without these novel assistants.

I have now found that equally good results, and in many cases, superior results are obtained if instead of the reaction product of dichlorhydrin and ammonia, one uses the water-soluble reaction products of epichlorhydrin and a water-soluble primary amine, that is, an amine of the general formula R—NH₂, where R stands for an alkyl radical or for an aralkyl or an aryl radical, which aralkyl and aryl radical contains solubilizing groups, such as SO₃H, COOH, or their salts.

The reaction products above mentioned are novel compounds, and are described more fully and claimed in copending application Ser. No. 670,748. Their constitution most probably corresponds to the formula

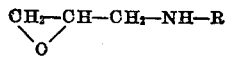

or polymerization products thereof, wherein R has the same significance as above. They are generally hygroscopic, syrup-like masses, which solidify to rosin-like products when cold or completely dry. They are readily soluble in water and alcohol in all proportions. Their aqueous solution is strongly basic, almost to the same degree as dilute caustic soda solution. They react readily with various acids to form neutral salts. Both inorganic acids, such as hydrochloric, sulfuric or phosphoric, or organic acids, such as sulfonic acids of the benzene, naphthalene or anthracene series may be used for this purpose. The salts resemble the free bases in most of their physical properties, and like the latter are highly useful as assistants for printing pastes containing vat dyestuffs. In application, according to this invention, the products may be mixed with the dyestuff paste prior to the latter's incorporation into the usual thickening and reducing mixture, or they may be added directly to the printing paste either during or after the incorporation of the dyestuff.

The exact formula of my new compounds is not known, although they are believed to be secondary amines having the formula as above given, or polymerization products thereof. Wherever in the specification or claims of this application formulæ are given, it is to be understood that such formulæ are merely representative of the possible structure of these compounds, based on the manner in which they are synthesized and on the chlorine and nitrogen analysis of the resulting products, and such formulæ are not to be used as limitations upon the scope of my invention. Furthermore, in the specification or claims, where the compounds are referred to by name, such as epihydrin-amines or epichlorhydrin-alkylamines, etc., these terms are used to cover the compounds obtainable by the processes herein described, and are not to be limited by particular formulæ.

The proportions may be varied within wide limits, ranging from 5–70% by weight of the (aqueous) dyestuff paste or 50–700% by weight of the dyestuff. The best results are usually obtained with printing pastes containing 30–50% of the novel assistants.

Without limiting my invention to any specific procedure, the following examples are given to illustrate my preferred mode of carrying out the same. Parts given are parts by weight.

A. PREPARATION OF THE PRINTING ASSISTANTS

*Example 1*

92 parts of epichlorhydrin and 736 parts of technical denatured ethyl alcohol are heated to 65–70° C. and a slow stream of monomethylamine gas (CH₃.NH₂) is allowed to pass over the surface of the agitated solution for a period of 14 hours, keeping the temperature at 65–70° C. There are then added about 400 parts of a 10% alcoholic caustic soda solution until the mass is distinctly and permanently alkaline to thymol phthaleine paper, whereupon the temperature is allowed to drop to room temperature and the sodium chloride is removed by a filtration. The filtrate is evaporated to dryness, in the final stages at 100° C. in vacuo, and the residue is stirred up to a syrup-like solution with 20% of its weight of hot water.

The product resembles in appearance and properties the epichlorhydrin-ammonia reaction product producible under similar conditions (Example 1 of copending application Ser. No. 670,746, filed of even date herewith). Like the latter it is excellently adapted for use as an assistant for printing pastes containing vat dyestuffs of the indanthrone series, and when so used increases the monotinctorial strength of the dyestuff and produces bright and even prints.

According to the nitrogen analysis, one mole of epichlorhydrin has evidently reacted with one mole of methylamine, forming a secondary amine which is free of organic-bound chlorine. The reaction most probably proceeds along the following lines:

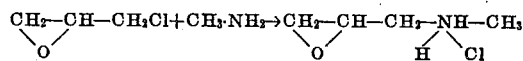

In the neutralization step with alcoholic alkali, the HCl group is split off leaving the free base

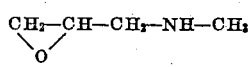

which may be termed epihydrin-methyl-amine.

If desired, the neutralization step may be omitted, and the reaction mass evaporated directly to give epihydrine-methyl-amine-hydrochloride. Alternatively, the hydrochloride may also be formed, by first isolating the base and then reacting the same in aqueous solution with hydrochloric acid, followed by evaporation to the desired consistency or to dryness. The latter method is applicable also for the preparation of other salts, such as the phosphate or anthraquinone-sulfonate.

*Example 2*

92 parts of epichlorhydrin and 400 parts of water are heated under vigorous agitation to 65–70° C. until thoroughly mixed and emulsified. There are then dropped in 200 parts of a 20% monomethylamine-water solution within a period of 1½ hours, keeping the temperature at 65–70° C. The emulsion turns into a clear solution, and this is then heated for another hour to 65–70° C. and then for one hour to 95° C. The solution is then evaporated under vacuum to dryness, raising the temperature finally to 100° C. The syrup-like residue is the hydrochloride of the product obtained in Example 1. It displays good printing assistant properties, when used in color pastes as described below.

*Example 3*

92 parts of epichlorhydrin and 736 parts of technical denatured alcohol are heated to 65–70° C. There are then dropped into this solution, under agitation, 61 parts of monoethanolamine (CH₂.OH—CH₂.NH₂), within a period of 1 to 2 hours, keeping the temperature at 65–70° C. The solution is then kept at reflux (about 75–80° C.) for 3 hours, cooled to 65° C. and treated at this temperature with about 400 parts of a 10% alcohol caustic soda solution until the mass is distinctly alkaline to thymol phthaleine paper. There are then distilled off about 400 parts of the alcohol; the residue is filtered; and the filtrate is evaporated to dryness at a final temperature of 100° C. in vacuo. The residual syrup-like residue is an efficient printing assistant when used in combinations with color pastes as described below. According to its nitrogen analysis it has most probably the following chemical constitution:

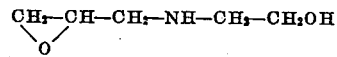

The hydrochloride of this assistant may be prepared according to the same procedure as described in Example 2, using 61 parts of monoethanolamine instead of the aqueous monomethylamine solution employed in that example.

*Example 4*

92 parts of epichlorhydrin and 736 parts of technical denatured alcohol are heated to 65° C. There are then dropped in at 65–70° C. 100 parts of a 60% ethylene-diamine water solution (NH₂.CH₂—CH₂.NH₂) within a period of 1 to 2 hours, keeping the temperature at 65–70° C. The solution is then heated for 1 hour to gentle reflux (75–80° C.) and then cooled to 60° C., whereupon about 400 parts of a 10% alcoholic caustic soda solution is added, until a distinct alkalinity on thymol phthaleine paper is obtained. 400 parts of the alcohol are then distilled off, the precipitated sodium chloride is filtered off, and the filtrate is evaporated to dryness at a final temperature of 100° C., in vacuo. The syrup-like residue is a valuable printing assistant. According to its nitrogen content one mole of ethylene diamine has reacted with 2 moles epichlorhydrin, forming most probably a compound of the formula

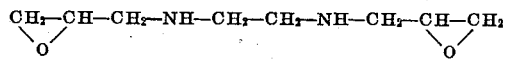

which may be called diepihydrine-ethylene-diamine.

The hydrochloride of this product may be obtained either by neutralizing the strongly alkaline reacting base with hydrochloric acid or by following the procedure described in Example 2 except using 50 parts of a 60% ethylene diamine water solution instead of the monoethanolamine solution employed in Example 2.

*Example 5*

92 parts of epichlorhydrin and 400 parts of water are heated under vigorous agitation to 65–70° C. There are then dropped in within a period of 1½ hours 152 parts of a 60% glucamine-water solution, keeping the temperature at 65–70° C. The solution is then stirred for another 10 hours at 65–70° C., the clear solution is poured off from a small amount of insoluble material and evaporated under vacuum to dryness at a final temperature of 100° C. The residual syrup-like residue is most probably the hydrochloride of the compound

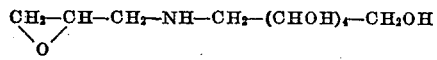

It displays valuable assistant properties in prints, when used as described below.

*Example 6*

60 parts of anthranilic acid are dissolved in 100 parts of water and about 17 parts of caustic soda, adjusting the alkalinity to very slight alkalinity on brilliant yellow paper.

This solution is dropped into an emulsion of 40 parts of epichlorhydrin and 100 parts of water over a period of 1½ hours, keeping the temperature at 75–80° C. and stirring the reaction mass vigorously. The mass is then stirred for another 14 hours at about 80° C. and acidified with hydrochloric acid, precipitating the reaction product out of solution in form of a soft gummy mass. The gummy mass is isolated and washed twice with warm water, and then dissolved in 500 parts dilute caustic soda solution, adjusting the alkalinity to just alkaline to brilliant yellow paper. The clear solution is poured off from a small amount of insoluble gummy residue and evaporated to dryness at a final temperature of 100° C. under vacuum. Into the semi-solid residue are stirred in about 20 parts of water until a clear syrup-like liquid is obtained, which displays valuable printing assistant properties, when used as described below.

Numerous variations are possible in the method of preparing the novel assistants, as will be readily understood by those skilled in the art.

In the amidation step the temperature may be lowered under 50° C., allowing a longer reaction time for completion of the reaction, or again a higher temperature, for instance, reflux temperature (75-80° C.) may be employed for a shorter time. It has been found, however, that higher temperatures at this stage of the reaction favor the formation of a gummy by-product which is insoluble in alcohol and water, and consequently lower the yield of usable assistant.

In the step of basing the hydrochlorides with a suitable alkali, the temperature at which this reaction is carried out may be chosen at will. 60-70° C. was preferred in the above examples because at this temperature the sodium chloride is formed in large crystals which will settle and can be filtered off readily. Aside from this point, however, any other temperature may be used. Other alkalies, such as potassium hydroxide or such sodium or potassium salts which act like caustic in alcoholic solution may be employed, as for instance, sodamide (NaNH$_2$).

The amounts of alcohol or water used may be varied within wide limits, and other solvents such as methyl, propyl, or butyl alcohol may be used.

Instead of using pure, distilled epichlorhydrin, the crude, wet product obtained from crude dichlorhydrin and lime may be used successfully.

B. PREPARATION OF THE DYESTUFF PASTE

*Example 7*

100 parts of anthrene blue RS (Color Index No. 1106) (10% paste) are mixed with 30 parts of the product obtained in any of the foregoing examples and the mixture is evaporated slowly at about 60-70° C., until its total weight is reduced to 100 parts. The resultant paste, when incorporated into the usual potash-formopon paste and printed upon cotton fabric, exhibits great tinctorial strength and gives prints of exceptional brilliance.

*Example 8*

50 parts of a press cake as obtained in the technical commercial manufacture of the halogenated indanthrone according to Examples 1 to 4 of U. S. Patent 1,862,843 and containing 20% by weight of the dyestuff are mixed with 40 parts by weight of any one of the products obtained in Examples 1 to 6. The resulting color paste, which may be milled to a smooth paste, is incorporated with the usual thickening and reducing agents and yields then upon cotton prints of greatly enhanced strength and brilliancy in comparison with the prints obtained by using the same dyestuff but without the novel assistants.

*Example 9*

The dyestuff paste is prepared as described in Example 8 except that a press cake containing 20% by weight of 3,3'-dibromo-indanthrone is used instead of the product of U. S. Patent 1,862,843.

The resulting color paste, containing about 30-50% of any one of the products of Examples 1 to 6 is then incorporated with the usual thickening and reducing agents and yields upon cotton comparatively strong and bright prints, whereas a dibromoindanthrone printing paste prepared without the novel assistants is much less suitable for printing purposes.

The thickening and reducing paste mentioned in the above examples may be prepared in the usual manner, and may contain the usual ingredients in any of the usual proportions and with any further assistants and dispersing agents which are commonly employed in this art. A typical composition and mode of preparation of the final printing paste is illustrated in the following example.

*Example 10*

Preparation of the printing paste:

25 parts of British gum, 5 parts of corn starch and 30 parts of cold water are mixed together into a smooth paste at about 70-80° C. 16 parts of potassium carbonate are now added; the mixture is stirred, cooled to about 60° C. and 16 parts of powdered sodium-formaldehyde-sulfoxylate are added. The mixture is further stirred and cooled and 8 parts of glycerine are added. Finally, 50 parts of the dyestuff mixtures as prepared in Examples 7 to 9 are added. The resultant pastes, when printed upon cotton fabric and developed in the usual manner, yield blue prints of exceptional brilliance and improved tinctorial strength.

It will be understood that many variations are possible in the procedure above set forth without departing from the spirit of this invention.

I claim:

1. A vat dyestuff printing paste comprising as assistant a water-soluble reaction product of epichlorhydrin and a water-soluble primary amine.

2. A vat dyestuff printing paste comprising as assistant a water-soluble reaction product of epichlorhydrin and a primary amine of the general formula R—NH$_2$, wherein R stands for an alkyl or for an aryl radical which aryl radical is further substituted by a solubilizing group.

3. A vat dyestuff printing paste comprising as assistant an addition salt of a compound as defined in claim 2.

4. A vat dyestuff printing paste comprising as assistant the hydrochloride of a compound as defined in claim 2.

5. A dyestuff paste comprising a vat dyestuff and a compound of the group consisting of epichlorhydrin-monoalkylamine condensation products and their addition salts.

6. A dyestuff paste comprising a vat dyestuff and a water-soluble reaction product of epichlorhydrin and a primary alkanolamine.

7. A printing paste comprising a vat dyestuff, a water-soluble reaction product of epichlorhydrin and a water-soluble primary amine, and thickening and reducing agents.

8. A printing paste as defined in claim 1, the dyestuff being a compound of the indanthrone series.

9. A printing paste as defined in claim 2, the vat dyestuff being a halogenated indanthrone.

10. A dyestuff paste comprising a 3,3'-dihalogen-indanthrone and a water soluble epichlorhydrin-monoalkylamine condensation product.

11. A dyestuff paste comprising a 3,3'-dihalogen-indanthrone and a water-soluble reaction product of epichlorhydrin and an alkanol amine.

12. The process of improving the printing qualities of a vat dyestuff, which comprises incorporating into the same the reaction product of epichlorhydrin and a water-soluble primary amine.

13. The process of improving the printing qualities of a vat dyestuff of the indanthrone series, which comprises incorporating into the same the reaction product of epichlorhydrin and a primary alkyl amine.

14. The process of improving the printing qualities of a vat dyestuff of the indanthrone series, which comprises incorporating into the same the reaction product of epichlorhydrin and a primary alkanol amine.

15. The process of printing cotton fabric which comprises applying thereto a printing paste comprising a vat dyestuff and a reaction product of epichlorhydrin and a water-soluble primary amine of the alkyl, or aryl series.

16. The process of printing cotton fabric which comprises applying thereto a printing paste comprising a vat dyestuff of the indanthrone series and an assistant of the group consisting of an epichlorhydrin - monalkylamine condensation product and addition salts thereof.

OTTO STALLMANN.